A. H. LYMN.
HEAT ACCUMULATOR.
APPLICATION FILED MAY 23, 1914.
1,207,186.
Patented Dec. 5, 1916.
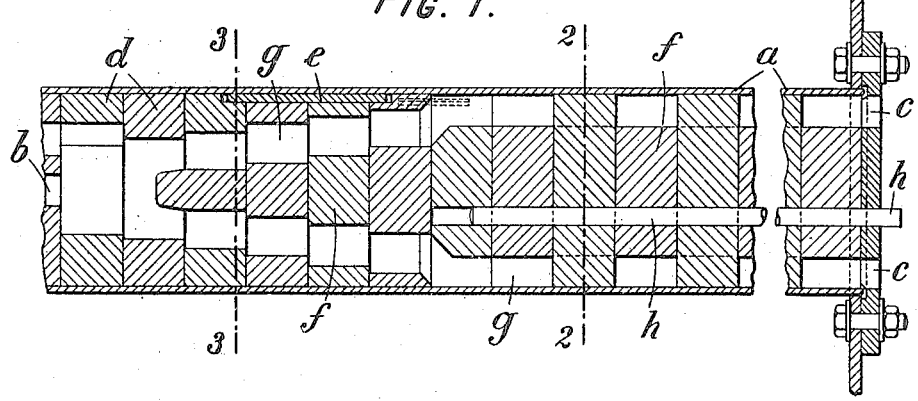
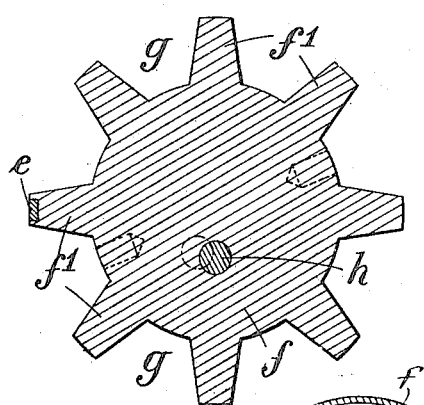
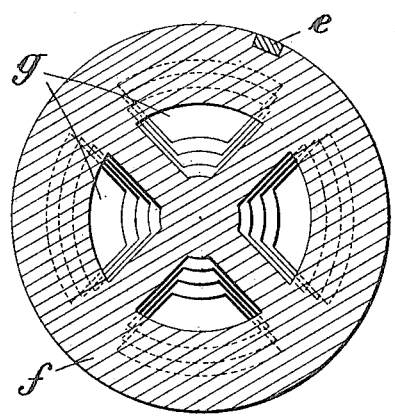
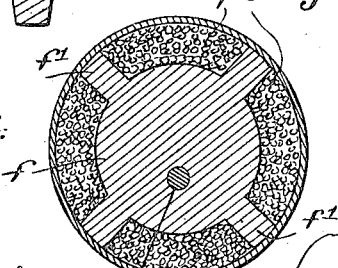
Attest
Ewd R. Tolson
Bessie L. Bishop
Inventor,
Arthur Henry Lymn,
by Spear, Middleton, Donaldson & Spear
Attys.

UNITED STATES PATENT OFFICE.

ARTHUR HENRY LYMN, OF WESTMINSTER, ENGLAND.

HEAT-ACCUMULATOR.

1,207,186.  Specification of Letters Patent.  Patented Dec. 5, 1916.

Application filed May 23, 1914. Serial No. 840,580.

*To all whom it may concern:*

Be it known that I, ARTHUR HENRY LYMN, a subject of the King of Great Britain and Ireland, residing at Westminster, England, have invented certain new and useful Improvements in Heat-Accumulators, of which the following is a specification.

This invention relates to heat accumulators, that is to say to means for the accumulation and transference of heat.

The device is intended for utilizing, for the purpose of heating any material, whether in a solid, liquid, or gaseous state, or of melting metals, and generally for the like operations, especially the generation of steam, the sensible heat contained in hot gases or vapors or heat set free by or resulting from combustion of gases, vapors, fine sprays, carbonaceous dusts, and the like. The present invention aims at enabling such heat to be utilized or transferred as completely as is practicable.

The apparatus, which is intended for accumulating heat and transferring said heat to any medium that is to be heated, comprises a tube, chamber, or like passage way for the heating medium provided in its interior with refractory material and adapted to be partially or entirely arranged within or surrounded by the material that is to be heated.

According to the present invention the refractory material is so arranged as to form a packing or filling of pieces adapted to present a large aggregate of surface to the heating medium and of which the whole, or a portion sufficient to lock the whole against accidental displacement, is in the form of shaped pieces adapted to be fitted in place. When referring to the tube chamber or other passage-way being packed or filled with the pieces of refractory material, it is of course to be understood that the tube chamber or other passage-way is so far filled up by the packing or filling as is compatible with the sufficiently free passage way of the heating medium.

The improved device has obvious advantages over tubes or other receptacles as heretofore proposed which were packed or filled with granular or fragmentary refractory material or substance or with the well-known fireclay balls placed loosely therein and intended to act more or less as a porous mass with the object of promoting so-called surface combustion; one of the disadvantages of such previous devices being that the granular or fragmentary material is liable in the course of time, not being properly bonded, to pack together locally so that there gradually forms an empty space which becomes to a greater or less extent ineffective or harmful, another, that except in the case of very small tubes shafts or chambers, the center thereof was liable to be more or less ineffective as compared with the outer part of the refractory material, and another that it was found difficult or impossible in comparatively large tubes (say of above 4 inches diameter) to insure that the center of the porous body of refractory material was capable of resisting the high temperatures that were obtained when utilizing for example lighting gas or coke oven gas.

By the term "shaped" it is to be understood herein that I mean, of any shape which is artificially or intentionally given to the blocks or pieces of refractory material to render them capable of being conveniently fitted into place and of fulfilling the purposes of the present invention.

The shaped pieces are so arranged that they are practically immovable, except by intention, so that the interstices or spaces must remain permanently constant or as at the outset.

The invention will now be described more fully with reference to certain examples thereof shown by way of illustration in the accompanying drawings, in which:—

Figure 1 is a longitudinal section of a more or less tubular structure embodying the features of the present invention; and Figs. 2 and 3 are transverse sections on the lines 2—2 and 3—3 respectively of Fig. 1. Fig. 4 is a cross section of Fig. 1 showing the refractory filling.

In the said drawings $a$ represents the outer walls of a tube, which may represent one of the smoke or combustion tubes of a boiler or tube intended to be used for any desired purpose; $b$ represents the inlet for the heating medium, and $c\ c$ the outlet. At the part of said tube where the heat is greatest, namely, near the inlet end thereof, the tube may be provided with a lining $d$ of refractory material, which is preferably in the form of fitted-together blocks or pieces; and at any part there may be provided a key $e$ or other retaining means to hold the blocks of the lining in place.

The tube $a$ has within its interior a core $f$, in this instance solid, of refractory material of such a diameter or section relatively to the tube as to leave a conveniently large annular or surrounding space or opening $g$ between said core and the walls or lining (where there is a lining) of the tube; and within such annular space may be integrally provided, or built in, or individually fixed or held in place by rods or the like, or attached to or held by the core or sleeve lining, pieces, blocks, or projections $f'$ of refractory material which more or less fill up said annular or surrounding space or opening but leave such interstices therein or therebetween as to permit the heating medium to pass through same at a rate suited to the proper accumulation and transference of the heat. In the drawing the space $g$ is shown as being partially filled up by projections $f'$ integral with the core sections $f$ but it is to be understood that separate pieces or lumps may be employed in addition to or instead of said projections, the tube $a$ being so packed or filled up with the refractory material as to leave only enough free space to permit of the sufficiently easy passage of the heating medium as shown in Fig. 4.

The core $f$ is made up of a number of sections which in the example illustrated are shown as being of small diameter at the end near the inlet and progressively increasing toward the outlet end to a certain point, after which they may be of a more or less uniform size. I do not, however, restrict myself to this, as the core as well as the passage-way for the heating medium may be of a constant, increasing, or diminishing area in cross section and such increase or decrease may be either regular or irregular so as to allow the heating medium to occupy more or less space in its passage through the different parts of the tube shaft or chamber, and thus to increase or decrease regularly or irregularly the speed of the heating medium or its proximity to the heating surface of the tube shaft or chamber. This will have a useful effect in causing the more intimate mixing together of the component parts of the heating medium and will also assist in causing them to give up their heat to the media or medium being heated.

In the example of a refractory section shown in Fig. 2 the core is more or less cylindrical in general shape and is provided with a number (in the present case eight) of the radiating arms $f'$ or projections the outer ends of which fit against the walls of the tube $a$. The space between said radiating arms or projections is filled or packed with refractory pieces $f^2$, shaped or otherwise if required as shown in Fig. 4. The sections may be secured in place by means of a rod $h$ inserted by preference eccentrically, on which a number of the said sections may be strung. Preferably such rod stops short of the hottest part of the tube in cases where the temperature of such hottest part is higher than the rod would be able to withstand. Or if desired instead of the rod $h$, or in addition thereto, one or more keys $e$ may be provided in the ends or any convenient part of the arms or projections $f'$ of the sections $f$; or any other suitable arrangements for achieving a similar object can be employed.

The arms or projections $f'$ of the several sections are preferably offset relatively to those of the adjacent sections so as to cause the heating medium to take a zigzag course as often and as thoroughly as possible in order to insure the intimate mixing together of the component parts of said heating medium. This remark may apply also to any of the other forms of the devices as hereinafter described, which for the purpose of such intimate mixing etc. would in practice be capable of very considerable variation.

In the example of a section $f$ as shown in Fig. 3 the core and lining are integral with each other, the spaces $g$ between them forming the passageways for the heating medium, and being filled or packed with shaped or other pieces of refractory material, if required, and the cross sectional area of such passage-way may be uniform, or may be varied by making the individual sections with the openings of different sizes as shown in this figure.

Although I particularly refer to shaped blocks or lumps of refractory material surrounding the said core, it must be understood that my invention is not limited thereto, and that it also includes tubes shafts or chambers having a central core surrounded by pieces of refractory material of fragmentary or indefinite shape which would be held in position by radial rods or projections attached to said core or in any other suitable manner and that it also includes a core surrounded by an empty space of dimensions just enough to allow of the sufficiently free passage of the heating medium as shown in Fig. 2. In case a hollow body is employed in this form of construction, it may either be used empty as shown in Fig. 3 or it may contain a medium as shown in Fig. 4. For example, the said core may be used for superheating steam or preheating feed water in the case of applying this invention to the generation of steam; or it may be used for preheating air or gas prior to combustion.

The inner surface of the walls of the tube, shaft or chamber may be partially or entirely lined with a refractory material as shown in Fig. 1; and if desired also the outer surface of said walls may be similarly lined, or the tube shaft or chamber itself may be made of refractory material.

In carrying the invention into practice, the kind of refractory material used may vary according to the use to which the device is put. For example, for the utilization of the heat of combustion of a coal distillation gas a more refractory substance would be required than for utilizing the waste gases from, say, a gas engine.

The word "refractory" as used herein is intended to mean refractory at the particular temperatures employed so that in some cases, where these temperatures are comparatively low, metallic "refractory materials" may even be employed.

As an example of the application of this invention to a steam generator there may be arranged within the water to be evaporated a tube or tubes of circular section with an internal diameter of say six inches and a length of three or four feet the said tubes or tube being provided with a solid refractory core of three or four inches diameter.

By my invention I am enabled to utilize satisfactorily tubes of much larger diameter than has heretofore been the case. I prefer that the tubes employed should be larger than the usual smoke tubes of locomotive or marine boilers; for example, this invention can even be applied to the large smoke tubes of a Lancashire boiler.

What I claim as my invention and desire to secure by Letters Patent is:—

1. A heat accumulator comprising in combination a container having in its interior a passage-way for a heating medium, a core of refractory material therein, and a filling of refractory material at least partly comprising shaped pieces interposed between said core and the walls of the container.

2. A heat accumulator comprising in com bination a container having in its interior a passage-way for a heating medium, a core of refractory material therein, and a filling of refractory material at least partly comprising shaped pieces interposed between said core and the walls of the container, at least a portion of said shaped pieces being integral with said core.

3. A heat accumulator comprising in combination a container having in its interior a passage-way for a heating medium, and a hollow refractory body therein formed around a solid refractory core adapted to serve as a passage-way for a medium that is to be heated.

4. A heat accumulator comprising in combination a container having in its interior a passage-way for a heating medium, a hollow refractory body therein formed around a solid refractory core adapted to serve as a passage-way for a medium that is to be heated and a filling of refractory material between said core and the walls of the container.

5. A heat accumulator comprising in combination a container having in its interior a passage-way for a heating medium, a hollow refractory body therein formed around a solid refractory core adapted to serve as a passage-way for a medium that is to be heated and a filling of refractory material between said core and the walls of the container said filling at least partly comprising shaped pieces lockingly fitted into place within said container and filling up the space between said core and the walls of the container so far as is compatible with allowing the heating medium to pass therethrough.

6. In a heat accumulator the combination of a container having in its interior a passage-way for a heating medium, and refractory material therein which is at least partly in the form of shaped pieces and fills up said passage-way so far as is compatible with the sufficiently free passage of the heating medium said passage-way being of varying cross-sectional area at various points in its length, the variation of the cross section being caused by an interior solid core of varying cross section.

In testimony whereof, I have affixed my signature in presence of two witnesses.

ARTHUR HENRY LYMN.

Witnesses:
 PERCY R. TAYLOR,
 W. E. ROGERS.

Copies of this patent may be obtained for five cents each, by addressing the "Commissioner of Patents, Washington, D. C."